United States Patent
Bae et al.

(10) Patent No.: US 12,184,749 B2
(45) Date of Patent: Dec. 31, 2024

(54) DISPLAY DEVICE AND OPERATION METHOD OF SAME

(71) Applicant: LG ELECTRONICS INC., Seoul (KR)

(72) Inventors: Kyungnam Bae, Seoul (KR); Eunjung Lee, Seoul (KR); Hyojeong Jeong, Seoul (KR); Byounghyun Shin, Seoul (KR); Jeonghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/558,477

(22) PCT Filed: Jun. 1, 2021

(86) PCT No.: PCT/KR2021/006798
§ 371 (c)(1),
(2) Date: Nov. 1, 2023

(87) PCT Pub. No.: WO2022/255506
PCT Pub. Date: Dec. 8, 2022

(65) Prior Publication Data
US 2024/0223680 A1 Jul. 4, 2024

(51) Int. Cl.
*H04L 69/164* (2022.01)
*H04N 21/4363* (2011.01)
*H04N 21/6375* (2011.01)

(52) U.S. Cl.
CPC ....... *H04L 69/164* (2013.01); *H04N 21/4363* (2013.01); *H04N 21/6375* (2013.01)

(58) Field of Classification Search
CPC ..... H04L 69/164; H04L 9/3231; H04L 69/40; H04N 21/4363; H04N 21/6375
(Continued)

(56) References Cited

U.S. PATENT DOCUMENTS 7,131,048 B2 * 10/2006 Suzuki ................ H04N 19/70
375/E7.199
2002/0026483 A1 * 2/2002 Isaacs ..................... H04L 51/04
709/206
(Continued)

FOREIGN PATENT DOCUMENTS

KR  10-2001-0038203  5/2001
KR  10-2005-0059799  6/2005
(Continued)

OTHER PUBLICATIONS

PCT International Application No. PCT/KR2021/006798, International Search Report dated Feb. 21, 2022, 4 pages.

*Primary Examiner* — Karen C Tang
(74) *Attorney, Agent, or Firm* — LEE, HONG, DEGERMAN, KANG & WAIMEY (57) ABSTRACT

A display device according to an embodiment of the present disclosure may comprise: a display unit; a wireless communication unit configured to communicate wirelessly with a mobile terminal; an external device interface unit configured to provide a wired connection with the router to wirelessly receive User Datagram Protocol (UDP) packet from the mobile terminal; and a control unit configured to: change the wired connection with the router to a wireless connection when a missing state of the UDP packet is detected based on the UDP packet received from the router, and receive the UDP packet from the router through the wireless communication unit.

11 Claims, 10 Drawing Sheets

(58) Field of Classification Search
USPC .......................................................... 709/231
See application file for complete search history.

(56) References Cited

U.S. PATENT DOCUMENTS

| | | | | |
|---|---|---|---|---|
| 2007/0133566 | A1* | 6/2007 | Copps | H04L 47/25 |
| | | | | 370/395.52 |
| 2008/0198787 | A1* | 8/2008 | Nguyen | H04L 1/187 |
| | | | | 370/315 |
| 2011/0116483 | A1* | 5/2011 | Lee | H04L 1/1887 |
| | | | | 370/338 |
| 2015/0109186 | A1* | 4/2015 | Layson, Jr. | G02B 27/017 |
| | | | | 345/8 |
| 2016/0127973 | A1 | 5/2016 | Seo et al. | |
| 2017/0289215 | A1* | 10/2017 | Lundrigan | H04L 65/1069 |
| 2018/0226668 | A1 | 8/2018 | Van Schaftingen et al. | |
| 2019/0155645 | A1* | 5/2019 | Browne | G06F 9/4881 |
| 2020/0296009 | A1* | 9/2020 | Dawes | H04L 43/0817 |
| 2023/0011484 | A1* | 1/2023 | Decenzo | H04W 36/302 |

FOREIGN PATENT DOCUMENTS

| | | |
|---|---|---|
| KR | 10-2010-0016954 | 2/2010 |
| KR | 10-2010-0025066 | 3/2010 |
| KR | 10-2011-0138516 | 12/2011 |
| KR | 10-2016-0050856 | 5/2016 |
| KR | 10-2018-0034513 | 4/2018 |

* cited by examiner

RTP packet header

| Offsets Octet | Octet Bit | 0 |   |   |   |   |   |   | 1 |   |    |    |    |    |    |    | 2  |    |    |    |    |    |    |    | 3  |    |    |    |    |    |    |    |
|---|---|---|---|---|---|---|---|---|---|---|---|---|---|---|---|---|---|---|---|---|---|---|---|---|---|---|---|---|---|---|---|---|
|   |   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | P | X | CC | | | | M | PT | | | | | | | Sequence number | | | | | | | | | | | | | | | |
| 4 | 32 | Timestamp |
| 8 | 64 | SSRC identifier |
| 12 | 96 | CSRC identifiers ... |
| 12+4xCC | 96+32xCC | Profile-specific extension header ID | | | | | | | | | | | | | | | | Extension header length |
| 16+4xCC | 128+4xCC | Extension header ... |

FIG. 9 sequence number of packet received when there is no packet loss: 1, 2, 3, 4, 5, 6, 7, 8, 9, 10 sequence number of packet received when there is packet loss: 1, 2,　　　　　, 7, 8, 9, 10 (3, 4, 5, 6 Packet loss is detected) → determine that packet is missed!

DISPLAY DEVICE AND OPERATION METHOD OF SAME

CROSS-REFERENCE TO RELATED APPLICATION(S)

This application is the National Stage filing under 35 U.S.C. 371 of International Application No. PCT/KR2021/006798, filed on Jun. 1, 2021, the contents of which is hereby incorporated by reference herein in its entirety.

TECHNICAL FIELD

The present invention relates to a display device, and more specifically, to a display device that exchanges packets with an external device through a router.

BACKGROUND ART

Digital TV services using wired or wireless communication networks are becoming common. Digital TV services are capable of providing various services that could not be provided by the existing analog broadcasting services.

For example, IPTV (Internet Protocol Television), a type of digital TV service, and smart TV service provide interactivity that allows user to actively select the type of program to watch and the viewing time. IPTV and smart TV service may provide various additional services, such as Internet search, home shopping, and online games, based on this interactivity.

Additionally, display device such as recent digital TV may receive packets from external device through a router. For example, a display device may provide functions such as screen mirroring, a screen sharing service, through a router.

However, in certain router, packet loss may occur in the process of transmitting packet wirelessly received from an external device to a wired display device.

Accordingly, on the display device side, video/audio may be broken or cut off, causing inconvenience in viewing for the user.

DISCLOSURE

Technical Problem

The purpose of the present disclosure is to detect packet loss in a router that is wired to a display device and to change the connection method between the router and the display device.

The purpose of the present disclosure is to detect packet loss in a router that is wired to a display device, change the connection method between the router and the display device, and thereby perform packet transmission between the router and the display device without interruption.

Technical Solution

A display device according to an embodiment of the present disclosure may comprise: a display unit; a wireless communication unit configured to communicate wirelessly with a mobile terminal; an external device interface unit configured to provide a wired connection with the router to wirelessly receive User Datagram Protocol (UDP) packet from the mobile terminal; and a control unit configured to: change the wired connection with the router to a wireless connection when a missing state of the UDP packet is detected based on the UDP packet received from the router, and receive the UDP packet from the router through the wireless communication unit.

A method of operating a display device connected by wire to a router that wirelessly receives UDP packet from a mobile terminal according to an embodiment of the present disclosure may comprise: receiving the UDP packet from the router; detecting a missing state of the UDP packet based on the received UDP packet; changing a wired connection with the router to a wireless connection when the missing state of the UDP packet is detected; and receiving the UDP packet from the router, through a wireless communication unit.

Advantageous Effects

According to various embodiments of the present invention, while receiving a mirroring service through a router, video or audio may be viewed without disruption or interruption.

Accordingly, even if a problem occurs with the router's wired performance, the user may receive the screen sharing service without the user's knowledge.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
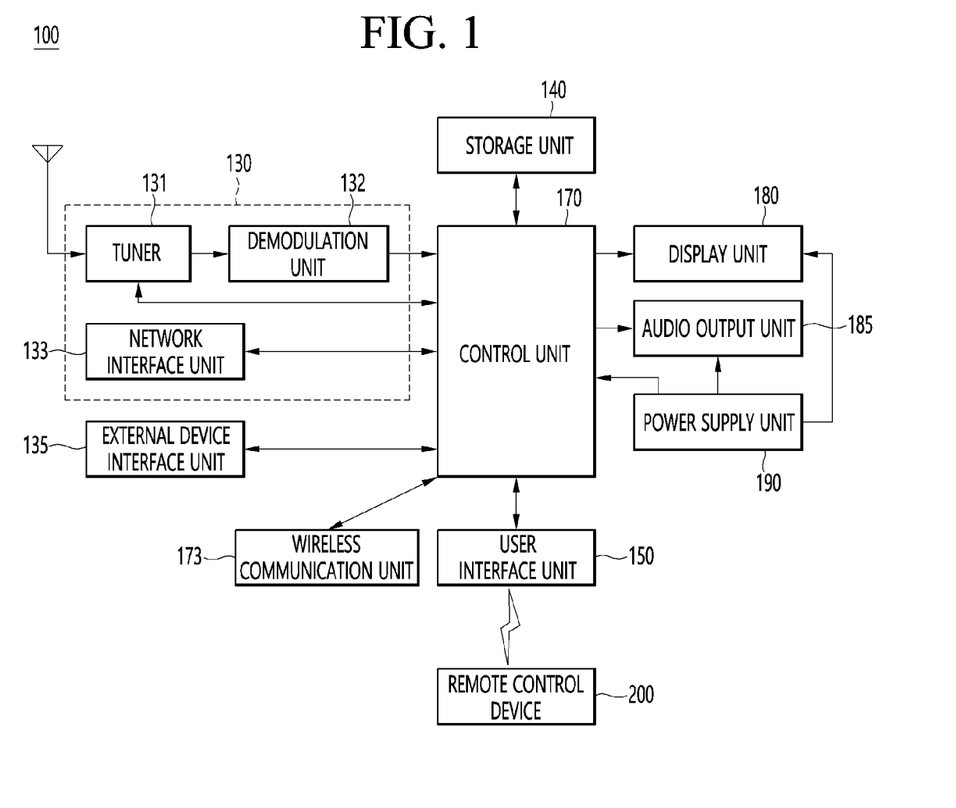
FIG. 1 is a block diagram illustrating a configuration of a display device according to an embodiment of the present disclosure.

FIG. 1 is a block diagram illustrating a configuration of a display device according to an embodiment of the present invention.

Referring to FIG. 1, a display device 100 may include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list in an adjacent external device and deliver it to the control unit 170 or the storage unit 140.

The external device interface unit 135 may provide a connection path between the display device 100 and an external device. The external device interface unit 135 may receive at least one an image or audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system, but this is just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface unit 133 may access a predetermined webpage through an accessed network or another network linked to the accessed network. That is, the network interface unit 133 may transmit or receive data to or from a corresponding server by accessing a predetermined webpage through the network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an Internet or content provider or a network operator.

The network interface unit 133 may select and receive a desired application among applications open to the air, through network.

The storage unit 140 may store signal-processed image, voice, or data signals stored by a program in order for each signal processing and control in the control unit 170.

Additionally, the storage unit 140 may perform a function for temporarily storing image, voice, or data signals output from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (for example, video files, still image files, music files, document files, application files, and so on) stored in the storage unit 140 and provide them to a user.

The user interface unit 150 may deliver signals input by a user to the control unit 170 or deliver signals from the control unit 170 to a user. For example, the user interface unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 may deliver, to the control unit 170, control signals input from local keys (not shown) such as a power key, a channel key, a volume key, and a setting key.

Image signals that are image-processed in the control unit 170 may be input to the display unit 180 and displayed as an image corresponding to corresponding image signals. Additionally, image signals that are image-processed in the control unit 170 may be input to an external output device through the external device interface unit 135.

Voice signal processed in the control unit 170 may be output to the audio output unit 185. Additionally, voice signals processed in the control unit 170 may be input to an external output device through the external device interface unit 135.

Besides that, the control unit 170 may control overall operations in the display device 100.

Additionally, the control unit 170 may control the display device 100 by a user command or internal program input through the user interface unit 150 and download a desired application or application list into the display device 100 in access to network.

The control unit 170 may output channel information selected by a user together with processed image or voice signals through the display unit 180 or the audio output unit 185.

Additionally, according to an external device image playback command received through the user interface unit 150, the control unit 170 may output image signals or voice signals of an external device such as a camera or a camcorder, which are input through the external device interface unit 135, through the display unit 180 or the audio output unit 185.

Moreover, the control unit 170 may control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform a wired or wireless communication with an external electronic device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown may be integrated, added, or omitted according to the specification of the actually implemented display device 100.

That is, if necessary, two or more components may be integrated into one component or one component may be divided into two or more components and conFIG.d. Additionally, a function performed by each block is to describe an embodiment of the present invention and its specific operation or device does not limit the scope of the present invention.

According to another embodiment of the present invention, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present invention described below may be performed by one of the display device described with reference to FIG. 1, an image processing device such as the separated set-top box, and a content playback device including the display unit 180 and the audio output unit 185.

Figure 2:
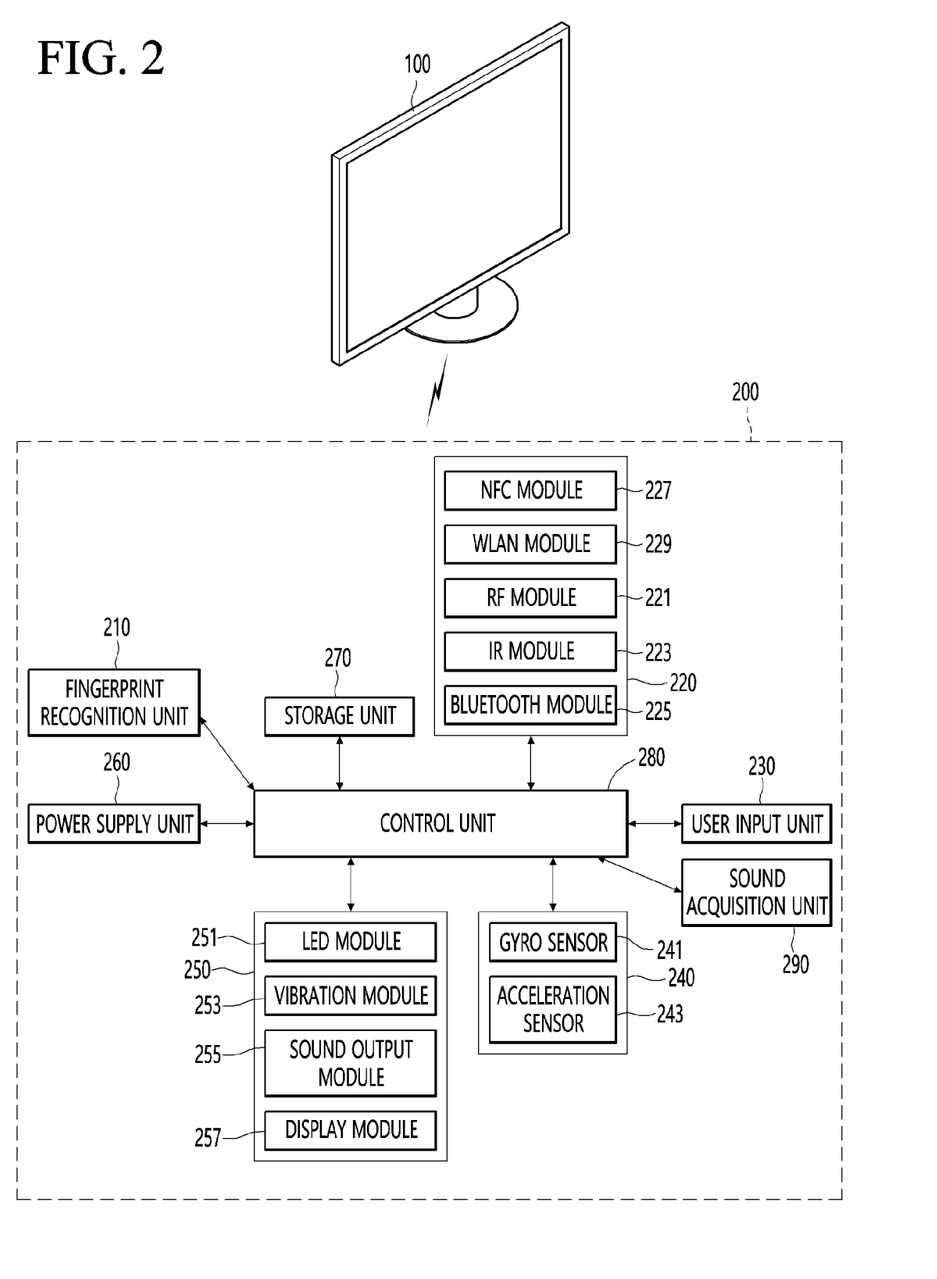
FIG. 2 is a block diagram illustrating a remote control device according to an embodiment of the present invention.
Figure 3:
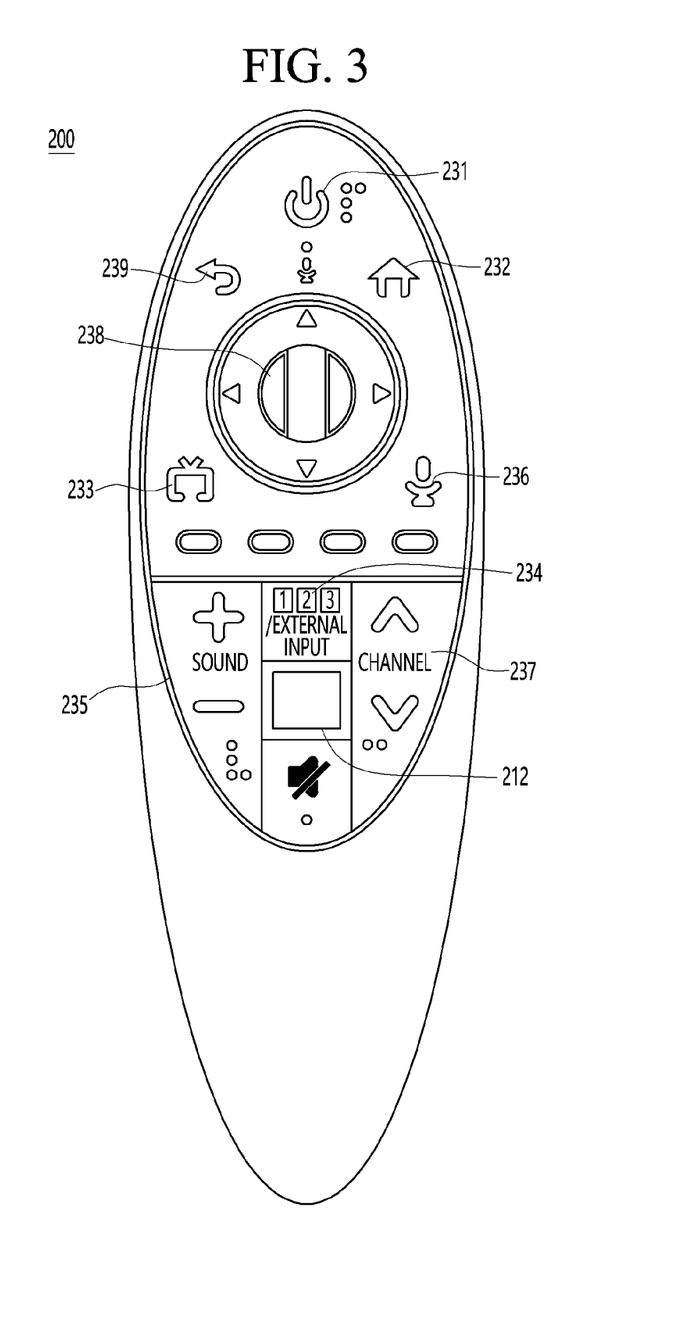
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present invention, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 will be explained.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present invention.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 230 or image or voice signals corresponding to signals transmitted from the display device 100. A user may recognize whether the user input unit 230 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to control of the remote control device 200. The control unit 280 may transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 may obtain voice.

The sound acquisition unit 290 may include at least one microphone and obtain voice through the microphone 291.

Next, FIG. 4 will be explained.

Figure 4:
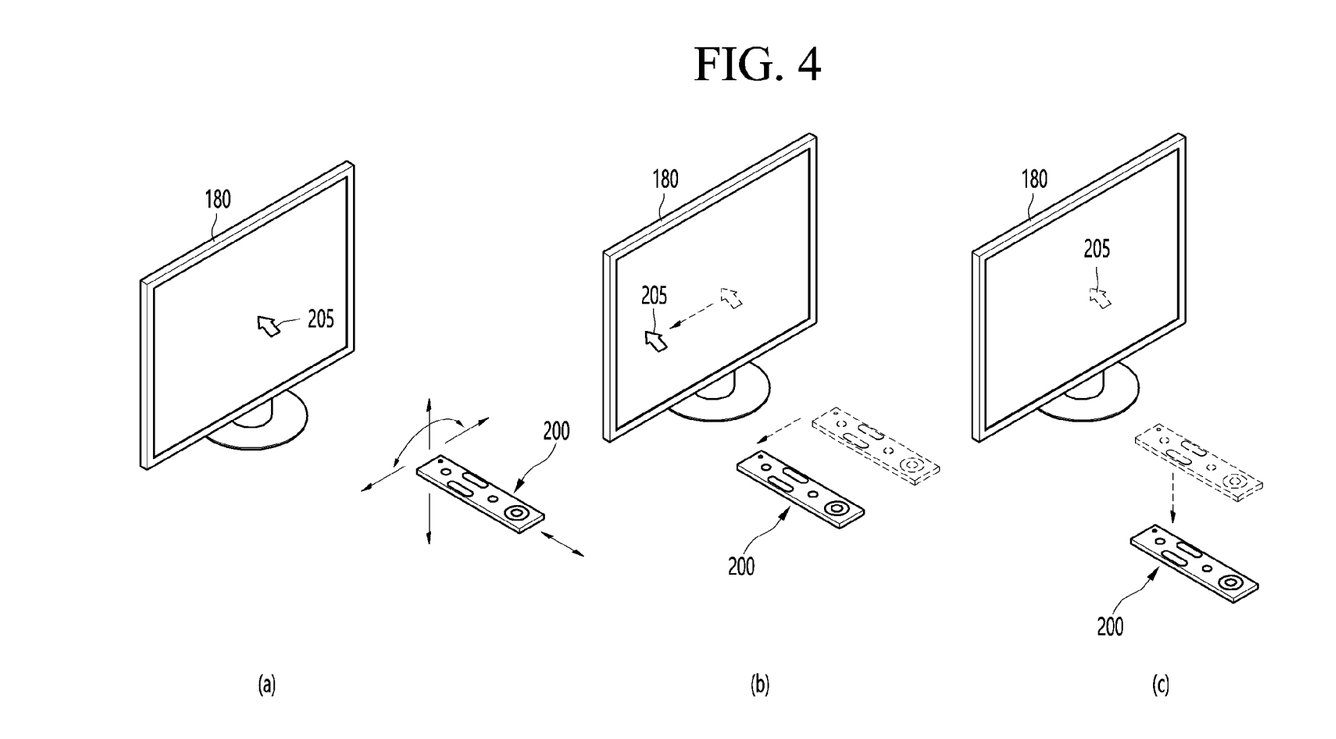
FIG. 4 is a view of utilizing a remote control device according to an embodiment of the present invention.

FIG. 4 is a view of utilizing a remote control device according to an embodiment of the present invention.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 may be zoomed in and displayed larger.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
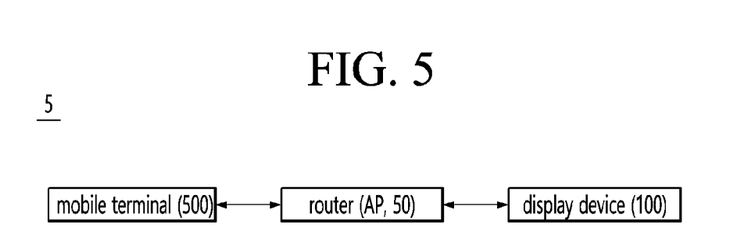
FIG. 5 is a diagram explaining the configuration of a display system according to an embodiment of the present invention.

FIG. 5 is a diagram explaining the configuration of a display system according to an embodiment of the present invention.

Referring to FIG. 5, the display system 5 may include a display device 100, a mobile terminal 500, and a router (Access Point, AP) 50.

The mobile terminal 500 and the display device 100 may provide a screen sharing service.

The mobile terminal 500 may transmit, to the display device 100, image data of the image the mobile terminal 500 is displaying, and the display device 100 may display the image being displayed by the mobile terminal 500 based on the received image data.

The mobile terminal 500 may be referred to as a source device in that it provides image, and the display device 100 may be referred to as a sink device in that it receives image.

The router 50 may relay IP communication between the mobile terminal 500 and the display device 100.

The router 50 may support Dynamic Host Configuration Protocol (DHCP) and assign an IP address to the mobile terminal 500 or display device 100 connected to the router 50.

The router 50 may wirelessly transmit the packet received from the mobile terminal 500 to the router 50. The router 50 may forward the received packet to the display device 100.

The mobile terminal 500 and the router 50 may perform wireless communication with each other. For example, the mobile terminal 500 and the router 50 may perform wireless communication through the Wi-Fi standard.

For this purpose, the mobile terminal 500 may be equipped with a Wi-Fi module.

The router 50 may exchange packet with the display device 100 wired or wirelessly.

When the router 50 performs wireless communication with the display device 100, the wireless communication standard used may be the Wi-Fi standard.

The display device 100 may communicate with the router 50 wired or wirelessly depending on the network environment.

The display device 100 is connected to the router 50 by wire, and when packet loss occurs from the router 50, the communication method with the router 50 may be switched from wired to wireless. This will be described later.

Figure 6:
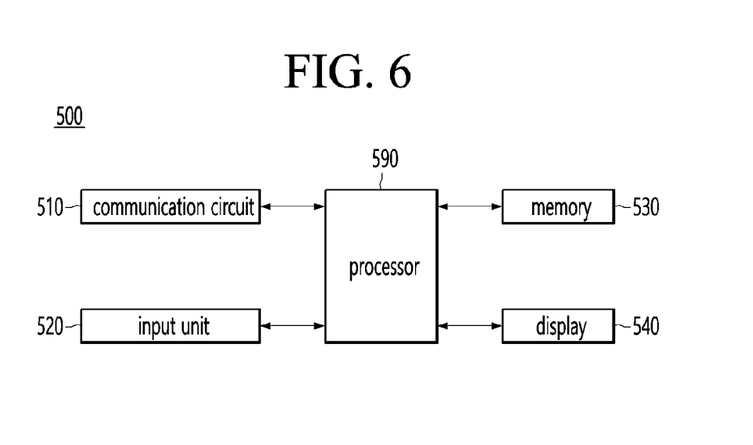
FIG. 6 is a block diagram illustrating the configuration of a mobile terminal according to an embodiment of the present invention.

FIG. 6 is a block diagram illustrating the configuration of a mobile terminal according to an embodiment of the present invention.

The mobile terminal 500 includes a projector, mobile phone, smartphone, desktop computer, laptop, digital broadcasting terminal, personal digital assistants (PDA), portable multimedia player (PMP), navigation, tablet PC, wearable device, set-top box (STB), It may be implemented as a fixed device or a movable device, such as a DMB receiver, radio, or desktop computer.

Referring to FIG. 6, the mobile terminal 500 may include a communication circuit 510, an input unit 520, a memory 530, a display 540, and a processor 590.

The communication circuit 510 may transmit and receive data with external device such as other mobile terminal or server using wired or wireless communication technology.

The communication circuit 510 includes GSM (Global System for Mobile communication), CDMA (Code Division Multi Access), LTE (Long Term Evolution), 5G, WLAN (Wireless LAN), Wi-Fi (Wireless-Fidelity), and Bluetooth. Communication may be performed using any one of the following communication standards: Radio Frequency Identification (RFID), Infrared Data Association (IrDA), ZigBee, and Near Field Communication (NFC).

The input unit 520 may include a camera for inputting video signal, a microphone for receiving audio signal, and a user input unit for receiving information from the user.

Here, the camera or microphone may be treated as a sensor, and the signal obtained from the camera or microphone may be referred to as sensing data or sensor information.

The memory 530 may store various software and data related to the operation of the mobile terminal 100.

The display 540 may display an image signal received from the outside.

The processor 590 may control the overall operation of the mobile terminal 100.

When linkage with an external device is required to perform an operation of the mobile terminal 100, the processor 590 may generate a control signal to control the external device and transmit the generated control signal to the external device.

The processor 590 may obtain intent information regarding user input and determine the user's request based on the obtained intent information.

The processor 590 may control at least some of the components of the mobile terminal 100 to run an application program stored in the memory 170.

The processor 590 may operate two or more of the components included in the mobile terminal 100 in combination with each other in order to run the application program.

Next, with reference to FIG. 7, a method of operating a display system according to an embodiment of the present invention will be described.

Figure 7:
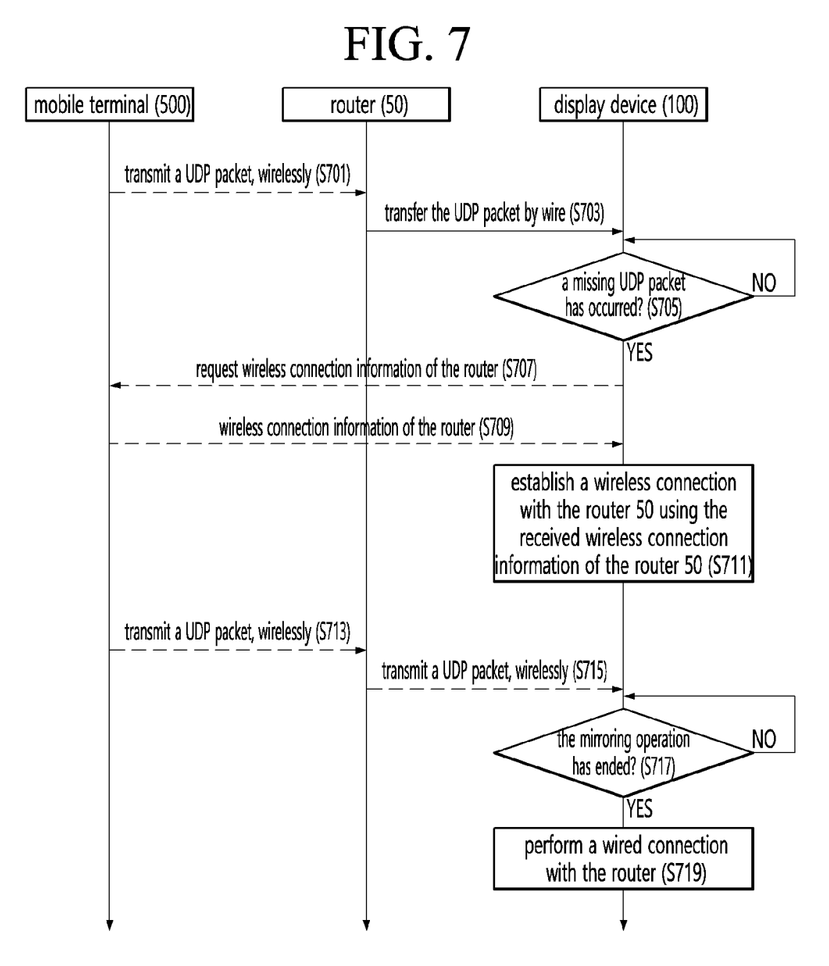
FIG. 7 is a flowchart explaining the operation of a display system according to an embodiment of the present invention.

FIG. 7 is a flowchart explaining the operation of a display system according to an embodiment of the present invention.

In particular, FIG. 7 may be an embodiment in which the mobile terminal 500 and the display device 100 provide a screen sharing service through the router 50.

The screen sharing service may be named a mirroring service.

Hereinafter, the router 50 may be a device that supports wired and wireless communication simultaneously.

Referring to FIG. 7, the router 50 wirelessly receives a User Datagram Protocol (UDP) packet from the mobile terminal 500 (S701).

The UDP packet may be a packet representing image data that the mobile terminal 500 is displaying through the display 540.

The router 50 may receive UDP packet from the mobile terminal 500 using the Real-time Transport Protocol (RTP).

The control unit 170 of the display device 100 receives a UDP packet by wire from the router 50 through the external device interface unit 135 (S703).

In one embodiment, the display device 100 may be connected to the router 50 by wire or wirelessly.

The display device 100 may be connected to the router 50 by wire through the external device interface unit 135.

The user may basically set the display device 100 to be connected to the router 50 by wire.

The control unit 170 of the display device 100 determines whether a missing UDP packet has occurred (S705).

The control unit 170 may detect a state in which UDP packet is missing from the router 50 in real time.

In one embodiment, the control unit 170 may determine the missing state of a UDP packet using information included in the UDP packet.

Specifically, the control unit 170 may use the sequence number included in the UDP packet to determine whether a UDP packet has been missed.

This will be explained with reference to FIGS. 8 and 9.

Figure 8:
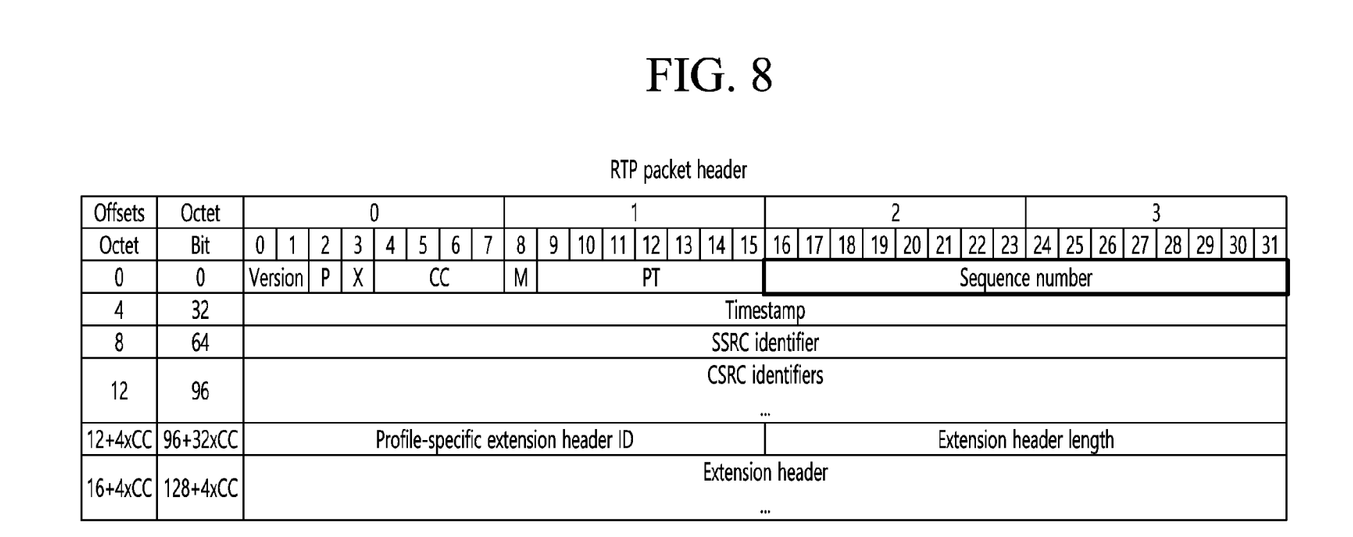
FIG. 8 is a diagram illustrating the structure of a header of a UDP packet according to an embodiment of the present disclosure.
Figure 9:
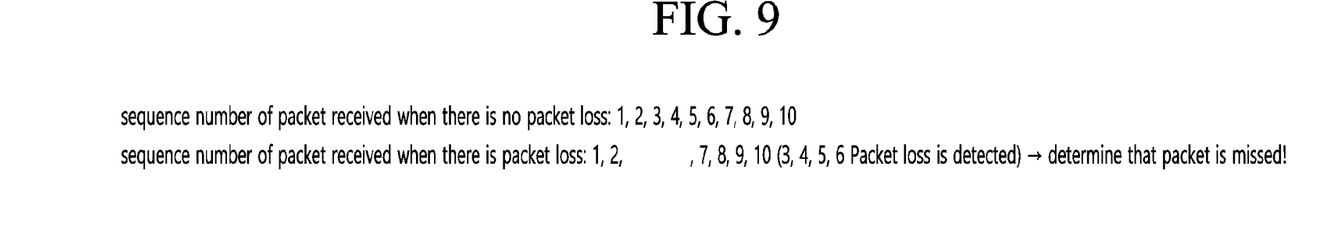
FIG. 9 is a diagram illustrating a method for determining missing UDP packet according to an embodiment of the present disclosure.

FIG. 8 is a diagram illustrating the structure of a header of a UDP packet according to an embodiment of the present disclosure and FIG. 9 is a diagram illustrating a method for determining missing UDP packet according to an embodiment of the present disclosure.

Referring to FIG. 8, it shows the header of a UDP packet that the router 50 transmits to the display device 100 via RTP by wire.

The header of the UDP packet may include a sequence number. The sequence number has a size of 16 bits and may indicate the order of UDP packet.

The sequence number may be increased according to the transmission order of UDP packet.

The control unit 170 may obtain a sequence number by parsing UDP packets that are sequentially transmitted.

If the sequence number included in the header of the UDP packet is not sequentially increased and is missing, the control unit 170 may determine that a loss of the UDP packet has occurred.

For example, if one or more UDP packet whose sequence numbers are out of sequence are generated, the control unit 170 may determine that the UDP packet is missing.

Referring to FIG. 9, when there is no missing UDP packet, the sequence number of the packet received by the display device 100 may be sequentially increased by 1 from 1 to 10.

If the sequence number of the UDP packet does not increase sequentially and some sequence numbers are missing, the control unit 170 may determine that the UDP packet is missing.

For example, as shown in FIG. 9, if sequence numbers 3, 4, 5, and 6 among sequence numbers 1 to 10 are missing, the control unit 170 determines that a UDP packet has been missed.

If two or more consecutive sequence numbers are missing, the control unit 170 may determine that a UDP packet has been omitted. However, this is only an example, and the control unit 170 may determine that a UDP packet has been omitted if one or more consecutive sequence numbers are omitted.

Again, FIG. 7 will be described.

If it is determined that a UDP packet has been missed, the control unit 170 of the display device 100 requests wireless connection information of the router 50 from the mobile terminal 500 through the wireless communication unit 173 (S707).

If a UDP packet is missing, the control unit 170 may request wireless connection information of the router 50 from the mobile terminal 500 in order to change the wired connection state with the router 50 to a wireless connection state.

This is because the mobile terminal 500 and the router 50 are wirelessly connected to each other, so the mobile terminal 500 holds the wireless connection information of the router 50.

In one embodiment, wireless connection information may include a service set identifier (SSID) and a password.

The SSID may be identification information that identifies the network, and the password may be information for accessing the wireless network of the router 50.

The control unit 170 may request wireless connection information from the mobile terminal 500 using the short-range communication module included in the wireless communication unit 173.

The short-range communication module may be a Bluetooth module, but this is only an example.

The control unit 170 of the display device 100 receives wireless connection information of the router 50 from the mobile terminal 500 in response to the request sent to the mobile terminal 500 (S709).

The control unit 170 of the display device 100 establishes a wireless connection with the router 50 using the received wireless connection information of the router 50 (S711).

That is, when the control unit 170 detects that a UDP packet is missing, it may switch the wired connection with the router 50 to a wireless connection.

The control unit 170 may change the wired connection with the router 50 to a wireless connection using the wireless connection information.

The control unit 170 may attempt to access the router 50 using the SSID included in the wireless connection information and establish a connection with the router 50 using a password.

In another embodiment, when the control unit 170 detects that a UDP packet is missing, it may attempt a wireless connection to the router 50 using the Device Provisioning Protocol (DPP) without wireless connection information.

The device provisioning protocol may be a method of establishing a wireless connection with the router 50 without a network password. The device provisioning protocol may also be named the well-known Wi-Fi Easy Connect protocol.

After the display device 100 and the router 50 are wirelessly connected, the router 50 wirelessly receives a UDP packet (S713) and wirelessly transmits the received UDP packet to the display device 100 (S715).

That is, in order to prevent missing UDP packet, the display device 100 may switch the connection with the router 50 to a wireless method and receive UDP packet.

As such, according to an embodiment of the present disclosure, the display device 100 may immediately perform a wireless connection with the router 50 even if a missing UDP packet is detected during the wired connection to the router 50.

Accordingly, additional loss of UDP packet may be prevented, thereby reducing image disruption or audio interruption in the display device 100.

User may focus on watching video without much inconvenience while receiving the mirroring service.

The control unit 170 of the display device 100 determines whether the mirroring operation has ended (S717), and if the mirroring operation has ended, re-establishes a wired connection with the router 50 (S719).

The control unit 170 may receive a command to terminate the mirroring operation between the display device 100 and the mobile terminal 500 from the remote control device 200 or the mobile terminal 500.

When the control unit 170 receives a command to end the mirroring operation, it may determine that the mirroring operation has ended.

When mirroring is terminated, the control unit 170 may switch the wireless connection with the router 50 to a wired connection. That is, the control unit 170 may deliver a message to the router 50 to terminate the wireless connection with the router 50.

The display device 100 may transmit a message to the router 50 to terminate the wireless connection and reactivate the wired connection.

Accordingly, the display device 100 may terminate the wireless connection with the router 50 and re-establish the wired connection.

FIGS. 10 to 14 are diagrams illustrating a method for verifying an embodiment of the present disclosure.

Figure 10:
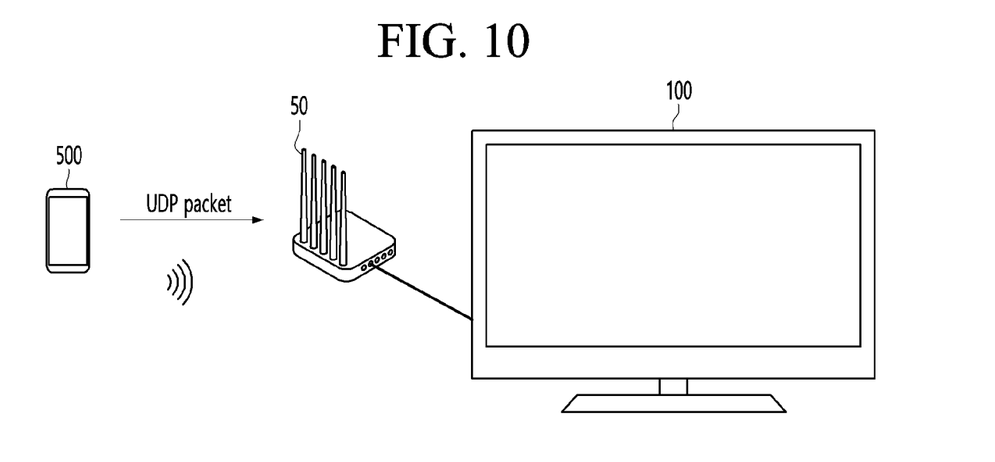
FIGS. 10 to 14 are diagrams illustrating a method for verifying an embodiment of the present disclosure.

Referring to FIG. 10, a mobile terminal 500, a router 50, and a display device 100 are shown.

In FIG. 10, it is assumed that the mobile terminal 500 is wirelessly connected to the router 50, and the display device 100 and the router 50 are connected by wire.

Additionally, the router 50 supports Dynamic Host Configuration Protocol (DHCP) and may assign an IP address to a host connected to the router 50.

In addition, in FIG. 10, it is assumed that the mobile terminal 500 wirelessly transmits a random UDP packet to the router 50, and the router 50 is a device that misses the received UDP packet.

In an embodiment of the present disclosure, when the router 50 misses a UDP packet, the display device 100 may switch the wired connection with the router 50 to a wireless connection.

If the IP address assigned to the display device 100 is an address indicating a wired connection, an embodiment of the present disclosure may have been applied, and if the IP address assigned to the display device 100 is an address indicating a wireless connection, an embodiment of the present disclosure may not have been applied.

Figure 11:
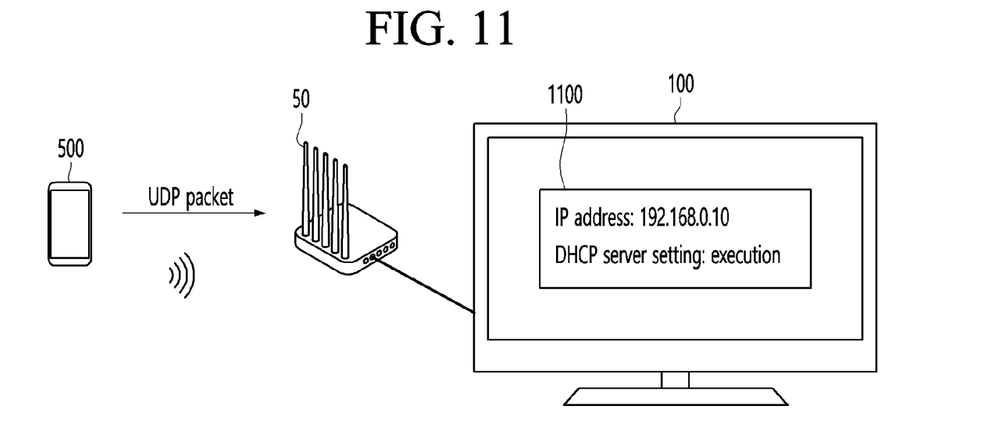

For example, referring to FIG. 11, the display device 100 may display network connection information 1100 on the display unit 180.

Network connection information 1100 may include information about IP address and DHCP server setting.

If the IP address included in the network connection information 1100 is an address that identifies a wired connection, it may be confirmed that the embodiment of the present disclosure has not been applied to the display device 100.

Figure 12:
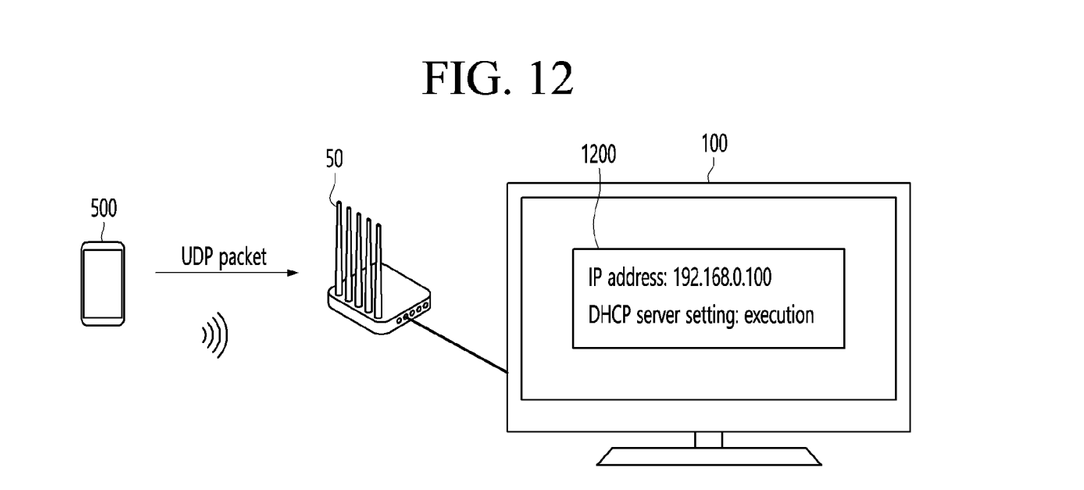

As shown in FIG. 12, if the IP address included in the network connection information 1200 is an address that identifies a wireless connection, it may be confirmed that the display device 100 has converted the wired connection to a wireless connection.

That is, when the display device 100 detects a missing UDP packet from the router 50, it may switch the connection with the router 50 from a wired connection to a wireless connection.

The display device 100 may convert the wired connection with the router 50 to a wireless connection and then display network connection information 1200 including an IP address identifying the wireless connection on the display unit 180.

The display device 100 may receive a command requesting display of network connection information 1200 from the remote control device 200.

Figure 13:
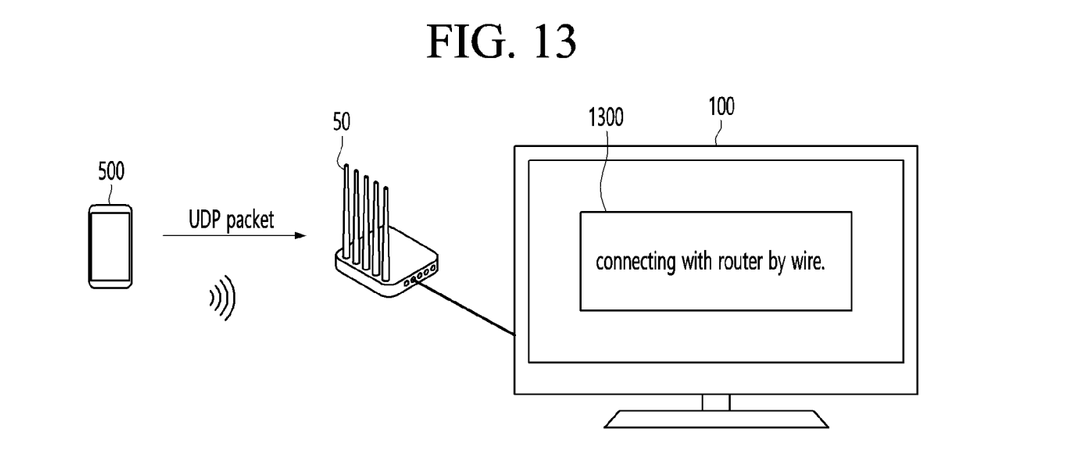
Figure 14:
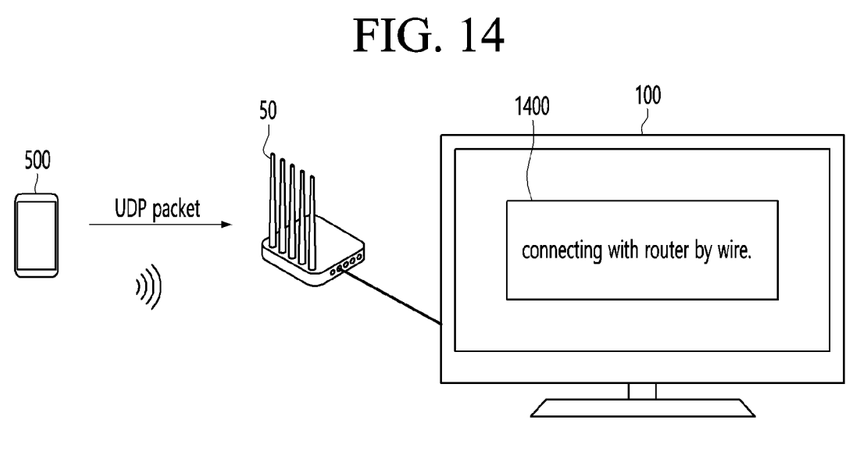

As another example, the connection status between the display device 100 and the router 50 may be confirmed through a network settings menu or message displayed on the display device 100.

For example, if the embodiment of the present disclosure is not applied to the display device 100, a network settings menu 1300 containing information indicating that the router 50 and the display device 100 are connected by wire may be displayed.

When an embodiment of the present disclosure is applied to the display device 100, the display device 100 may display a network setting menu 1400 on the display unit 180 indicating that the display device 100 is wirelessly connected to the router 50.

The user may check whether the display device 100 has switched the connection with the router 50 to a wireless connection through the network setting menu.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage device.

The display device described above is not limited to the configuration and method of the embodiments described above, and the embodiments may be configured by selectively combining all or part of each embodiment so that various modifications may be made.

What is claimed is:

1. A display device connected to a router by wire, comprising:
    a display unit;
    a wireless communication unit configured to communicate wirelessly with a mobile terminal;
    an external device interface unit configured to provide a wired connection with the router to wirelessly receive User Datagram Protocol (UDP) packet from the mobile terminal; and
    a control unit configured to:
        change the wired connection with the router to a wireless connection when a missing state of the UDP packet is detected based on the UDP packet received from the router,
        detect a missing of the UDP packet based on a sequence number included in the UDP packet, display, on the display unit, an IP address indicating that the wireless connection has been established between the display device and the router, and
receive the UDP packet from the router through the wireless communication unit.

2. The display device of claim 1, wherein the control unit is further configured to display, on the display unit, a message indicating that a wireless connection has been established between the display device and the router.

3. The display device of claim 1, wherein the control unit is further configured to: obtain the sequence number of each UDP packet received sequentially, and if the obtained sequence number does not increase sequentially, determine that a missing state of the UDP packet is detected.

4. The display device of claim 1, wherein the UDP packet includes image data or audio data for mirroring with the mobile terminal, wherein the control unit is further configured to rechange the wireless connection between the display device and the router to the wired connection when the mirroring is terminated.

5. The display device of claim 1, wherein the control unit is further configured to:
request wireless connection information of the router from the mobile terminal through the wireless communication unit, receive the wireless connection information from the mobile terminal, and perform the wireless connection with the router based on the received wireless connection information.

6. The display device of claim 5, wherein the wireless connection information includes a service set identifier and a password.

7. A method of operating a display device connected by wire to a router that wirelessly receives UDP packet from a mobile terminal,
receiving the UDP packet from the router; detecting a missing state of the UDP packet based on the received UDP packet;
changing a wired connection with the router to a wireless connection when the missing state of the UDP packet is detected;
detecting a missing of the UDP packet based on a sequence number included in the UDP packet;
displaying, by the display device, an IP address indicating that the wireless connection has been established between the display device and the router; and
receiving the UDP packet from the router, through a wireless communication unit.

8. The method of claim 7, further comprising:
displaying a message, on a display unit, indicating that a wireless connection has been established between the display device and the router.

9. The method of claim 8, wherein the detecting step comprises:
obtaining the sequence number of each UDP packet received sequentially, and if the obtained sequence number does not increase sequentially, determining that a missing state of the UDP packet is detected.

10. The method of claim 7, wherein the UDP packet includes image data or audio data for mirroring with the mobile terminal,
wherein the method further comprises:
rechanging the wireless connection between the display device and the router to the wired connection when the mirroring is terminated.

11. The method of claim 7, further comprising:
requesting wireless connection information of the router from the mobile terminal through the wireless communication unit,
wherein the rechanging step comprises:
receiving the wireless connection information from the mobile terminal, and
performing the wireless connection with the router based on the received wireless connection information.

* * * * *